US012695258B2

(12) United States Patent
Chen et al.

(10) Patent No.: US 12,695,258 B2
(45) Date of Patent: Jul. 28, 2026

(54) ELECTRONIC ASSEMBLY HAVING ELECTRICAL CONNECTOR CONNECTING ELECTRONIC COMPONENTS

(71) Applicant: HUAWEI TECHNOLOGIES CO., LTD., Shenzhen (CN)

(72) Inventors: Zongxun Chen, Donguan (CN); Jiankang Li, Chengdu (CN); Huan Pei, Donguan (CN); Jiang Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 298 days.

(21) Appl. No.: 18/466,835

(22) Filed: Sep. 14, 2023

(65) Prior Publication Data

US 2023/0420900 A1 Dec. 28, 2023

Related U.S. Application Data

(63) Continuation of application No. PCT/CN2022/080042, filed on Mar. 10, 2022.

(30) Foreign Application Priority Data

Mar. 26, 2021 (CN) ......................... 202110327900.7

(51) Int. Cl.
*H01R 33/76* (2006.01)
*H01R 12/57* (2011.01)
(Continued)

(52) U.S. Cl.
CPC ......... *H01R 33/7664* (2013.01); *H01R 12/57* (2013.01); *H01R 12/716* (2013.01); *H01R 13/652* (2013.01); *H01R 13/6587* (2013.01)

(58) Field of Classification Search
CPC .. H01R 33/7664; H01R 12/57; H01R 12/716; H01R 13/652
(Continued)

(56) References Cited

U.S. PATENT DOCUMENTS 4,793,814 A * 12/1988 Zifcak ................ H01R 13/2435 439/91
5,474,458 A * 12/1995 Vafi ................... H01L 23/49827 439/91
(Continued)

FOREIGN PATENT DOCUMENTS

CN 103579190 A 2/2014
CN 105896189 A 8/2016
(Continued)

*Primary Examiner* — Hae Moon Hyeon

(57) ABSTRACT

An electronic assembly includes a first electronic component, a second electronic component, and an electrical connector connecting the first electronic component and the second electronic component. The electrical connector includes a first multilayer circuit board and a terminal that includes a plurality of signal terminals and a plurality of ground terminals. Each signal terminal is electrically connected to a signal interface of the first electronic component and a signal interface of the second electronic component. Signal terminals configured to transmit a same signal form one group of signal terminals, and at least one ground terminal is disposed between two adjacent groups of signal terminals. The first multilayer circuit board includes at least one layer of first ground copper sheet. The first electronic component includes a second multilayer circuit board, and the second multilayer circuit board includes at least one layer of second ground copper sheet.

20 Claims, 11 Drawing Sheets

(51) Int. Cl.
*H01R 12/71* (2011.01)
*H01R 13/652* (2006.01)
*H01R 13/6587* (2011.01)

(58) Field of Classification Search
USPC ............................................. 439/66, 108, 73
See application file for complete search history.

(56) References Cited

U.S. PATENT DOCUMENTS

| | | | | |
|---|---|---|---|---|
| 6,586,684 | B2 * | 7/2003 | Frutschy | H05K 7/1092 361/767 |
| 6,793,503 | B2 | 9/2004 | Dishongh et al. | |
| 6,891,258 | B1 | 5/2005 | Alexander et al. | |
| 7,025,607 | B1 * | 4/2006 | Das | H01G 4/206 439/85 |
| 7,950,927 | B2 * | 5/2011 | Kazama | G01R 1/0466 324/755.05 |
| 8,133,061 | B1 * | 3/2012 | Ayers, Sr. | H01R 12/714 439/66 |
| 9,276,336 | B2 * | 3/2016 | Rathburn | H01R 12/52 |
| 2005/0277310 | A1 * | 12/2005 | Dibene | H01R 12/52 439/66 |
| 2009/0017682 | A1 | 1/2009 | Amleshi et al. | |
| 2009/0053908 | A1 * | 2/2009 | Hougham | H01R 12/00 439/66 |
| 2012/0315803 | A1 * | 12/2012 | Kobayashi | H01R 12/714 29/874 |
| 2013/0330945 | A1 * | 12/2013 | Chang | H05K 7/10 439/81 |
| 2015/0214665 | A1 | 7/2015 | Heppner et al. | |
| 2022/0330417 | A1 * | 10/2022 | Li | H01L 23/48 |

FOREIGN PATENT DOCUMENTS

| | | | | |
|---|---|---|---|---|
| CN | 106797098 | A | 5/2017 | |
| CN | 104167631 | B | 7/2017 | |
| CN | 206461179 | U | 9/2017 | |
| CN | 207165858 | U | 3/2018 | |
| CN | 109473805 | A | 3/2019 | |
| JP | H09223762 | A | 8/1997 | |
| JP | 2000349192 | A | 12/2000 | |
| JP | 2005516375 | A | 6/2005 | |
| JP | 2005518067 | A | 6/2005 | |
| JP | 2011501358 | A | 1/2011 | |
| JP | 2012511810 | A | 5/2012 | |
| JP | 2013051448 | A | 3/2013 | |
| WO | WO-2018139045 | A1 * | 8/2018 | H05K 1/148 |
| WO | 2021052039 | A1 | 3/2021 | |

* cited by examiner

ELECTRONIC ASSEMBLY HAVING ELECTRICAL CONNECTOR CONNECTING ELECTRONIC COMPONENTS

CROSS-REFERENCE TO RELATED APPLICATIONS

This application is a continuation of International Application PCT/CN2022/080042, filed on Mar. 10, 2022, which claims priority to Chinese Patent Application 202110327900.7, filed on Mar. 26, 2021. The disclosures of the aforementioned priority applications are hereby incorporated by reference in their entirety.

TECHNICAL FIELD

This application relates to the field of electronic device technologies, and in particular, to an electronic assembly and an electronic device.

BACKGROUND

An electronic device includes a large quantity of structures such as an electronic component and a circuit board. To implement signal transmission, an electrical connector is usually used to implement signal transmission between the electronic components, signal transmission between the electronic component and the circuit board, or signal transmission between circuit boards. In conclusion, there are very rich application scenarios of the electrical connector in the electronic device. With development of technologies, the electronic device has a higher signal transmission speed, and imposes a high requirement on performance of the electrical connector.

An electrical connector connecting a chip and the circuit board is used as an example. The electrical connector includes a plurality of terminals, and the terminal is configured to transmit a signal, to ensure normal operation of the electronic device. Because electrical connectors have different shapes and sizes of terminals, wiring widths of circuit boards, and sizes of pads, an impedance discontinuity inevitably occurs in an entire signal transmission link. In addition, as a degree of integration of the chip becomes higher, a density of pins of the chip becomes higher. With an increase in a signal transmission rate, mutual electromagnetic crosstalk and noise of terminals are inevitable when a high-speed signal is transmitted. However, if the electromagnetic crosstalk and noise of signals of adjacent terminals exceed a threshold, resonance may even be generated. This affects normal transmission of the high-speed signal, and even affects normal operation of the chip in a severe case, or even damages the chip. Therefore, crosstalk between terminals needs to be reduced, to improve a signal transmission rate of the electrical connector.

SUMMARY

This application provides an electronic assembly and an electronic device, to reduce crosstalk between signal terminals, improve a signal transmission rate of the electronic assembly, and simplify structures of an electrical connector and the electronic assembly.

According to a first aspect, this application provides an electronic assembly. The electronic assembly includes a first electronic component, a second electronic component, and an electrical connector. The electrical connector is located between the first electronic component and the second electronic component, and the first electronic component and the second electronic component are electrically connected by using the electrical connector. Specifically, the electrical connector includes a terminal and a first multilayer circuit board. In other words, the first multilayer circuit board is configured to fasten the terminal. The terminal includes a signal terminal and a ground terminal, and the signal terminal of the electrical connector is electrically connected to a signal interface of the first electronic component and a signal interface of the second electronic component, to transmit a signal between the first electronic component and the second electronic component. The signal includes a digital signal such as a high-speed signal, a clock signal, and an input/output signal, and may further include a power supply signal. The ground terminal of the electrical connector is grounded, to shield a signal, and shield signal crosstalk. Signal crosstalk between signal terminals is mainly shielded herein. For ease of description, in this application, signal terminals configured to transmit a same signal are one group of signal terminals, and at least one ground terminal is disposed between any two adjacent groups of signal terminals. In other words, the ground terminal separates the signal terminals, and at least one ground terminal definitely exists on a side that is of any signal terminal and on which another signal terminal exists. For example, if signal terminals exist around a signal terminal, ground terminals exist around the signal terminal. The ground terminal forms a shielding wall around the signal terminal.

The first multilayer circuit board includes at least one layer of first ground copper sheet. The first electronic component may include a second multilayer circuit board, and the second multilayer circuit board includes at least one layer of second ground copper sheet. The ground terminal is electrically connected to the first ground copper sheet and the second ground copper sheet. In this solution, the first ground copper sheet and the second ground copper sheet share a ground with the ground terminal. Therefore, the first ground copper sheet, the ground terminal, and the second ground copper sheet may form a shielding cage with good sealing performance, and the shielding cage has a good shielding effect for a signal terminal located in the shielding cage. The shielding cage not only may prevent an interference signal of the signal terminal located in the shielding cage from causing crosstalk to another signal terminal, but also may prevent an interference signal of another signal terminal outside the shielding cage from causing crosstalk to the signal terminal in the shielding cage, or prevent interference of another interference source to the signal terminal in the shielding cage. When an anti-crosstalk effect between signal terminals is good, a signal transmission rate of the electronic assembly can be increased, and power of the first electronic component and power of the second electronic component can be increased. A structure of the electrical connector in this solution is simple, and the ground terminal may be manufactured when the signal terminal is manufactured. In this solution, a high signal transmission rate can be supported, and the electronic assembly has a strong interference shielding capability, to help improve performance of the electronic assembly.

The second electronic component may further include a third multilayer circuit board, the third multilayer circuit board includes at least one layer of third ground copper sheet, and the ground terminal of the electrical connector is further electrically connected to the third ground copper sheet. In this case, the first ground copper sheet, the ground terminal, and the third ground copper sheet may form another shielding cage, to shield a part that is of the signal terminal and that is located between the first multilayer circuit board and the second electronic component, so as to further improve an anti-crosstalk capability of an electronic component, improve a signal transmission rate of the electronic assembly, and improve performance of the electronic assembly.

Specifically, when the electrical connector is disposed, the signal terminal may alternatively be a differential signal terminal. In this case, each group of signal terminals includes two differential signal terminals, and at least one ground terminal is disposed between any two adjacent groups of differential signal terminals. The differential signal terminal is used to transmit a signal, to further improve an anti-interference capability of the electrical connector, improve a signal transmission rate of the electrical connector, and further improve a signal rate of an electronic assembly for which the electrical connector is used.

When the signal terminal is a differential signal terminal, two ground terminals may be disposed between any two adjacent groups of differential signal terminals, so that the ground terminal may be in a one-to-one correspondence with the differential signal terminal, to comprehensively shield an interference signal of the signal terminal, and achieve a good shielding effect.

A structure of the ground terminal may be the same as a structure of the signal terminal, to simplify a manufacturing process of the electrical connector. In this way, manufacturing and processing are facilitated.

When terminals that are electrically connected include ground terminals disposed adjacent to each other, the adjacent ground terminals are electrically connected, so that the adjacent ground terminals can form an entire shielding face, to improve a shielding effect. For example, when the signal terminal is a differential signal terminal, one side of each differential signal terminal may correspond to one ground terminal. Therefore, one side of two differential signal terminals corresponds to two ground terminals, and the two ground terminals are electrically connected, to improve a shielding effect of the ground terminal for the differential signal terminal.

In another technical solution, a width of the ground terminal may be greater than a width of the signal terminal. Therefore, when the ground terminal is in a one-to-one correspondence with the signal terminal, a shielding effect of the ground terminal may be better. Alternatively, in another application scenario, one ground terminal may correspond to two differential signal terminals, and a width of one ground terminal may cover a width of the two differential signal terminals. The shielding effect can also be improved.

Specific types of the first electronic component and the second electronic component are not limited in this application. In a specific technical solution, the first electronic component may be a chip, and the second electronic component may be a main board. Usually, a chip has a high requirement for the signal transmission rate, and the signal transmission rate is also an important performance indicator of the chip. Therefore, this application is of important significance for an electronic assembly with a chip.

According to a second aspect, this application further provides an electronic device. The electronic device includes a housing, a power module, and the electronic assembly in any one of the foregoing technical solutions. The power module and the electronic assembly are disposed on the housing. The power module is electrically connected to the electronic assembly, to implement electrical transmission of the electronic assembly. The electronic assembly of the electronic device has strong anti-interference performance and a high rate, so that performance of the electronic device is good.

In a specific technical solution, a specific type of the electronic device is not limited. For example, the electronic device may be a computing device, a network device, a storage device, a vehicle-mounted device, or a terminal device.

DESCRIPTION OF REFERENCE NUMERALS

1: Electronic assembly; 11: Electrical connector;
111: Terminal; 1111: Signal terminal;
1112: Ground terminal; 1113: First signal terminal portion;
1114: Second signal terminal portion; 1115: First ground terminal portion;
1116: Second ground terminal portion; 112: First multilayer circuit board;
112': Fastening board; 1121: First side surface;
1122: Second side surface; 1123: First ground copper sheet;
113: Frame body; 12: First electronic component;
121: Second multilayer circuit board; 1211: Second ground copper sheet;

13: Second electronic component; 131: Third multilayer circuit board;
1311: Third ground copper sheet;
2: Housing; 20 Electronic Device;
3: Heat sink;
4: Power Module;
50: Internal cabling;
52: Conductive through hole/blind hole;
54: Inner wall of conductive through hole/blind hole; and
56*a*, 56*b*: Pads.

DESCRIPTION OF EMBODIMENTS

Terms used in the following embodiments are merely intended to describe specific embodiments, but are not intended to limit this application. As used in the specification and appended claims of this application, singular expressions "one", "a", "the foregoing", "the", and "the one" are also intended to include expressions such as "one or more", unless the contrary is clearly indicated in the context.

Reference to "an embodiment", "a specific embodiment", or the like described in this specification indicates that one or more embodiments of this application include a specific feature, structure, or characteristic described with reference to embodiments. The terms "include", "comprise", "have", and their variants all mean "include but are not limited to", unless otherwise specifically emphasized in another manner.

Figure 1:
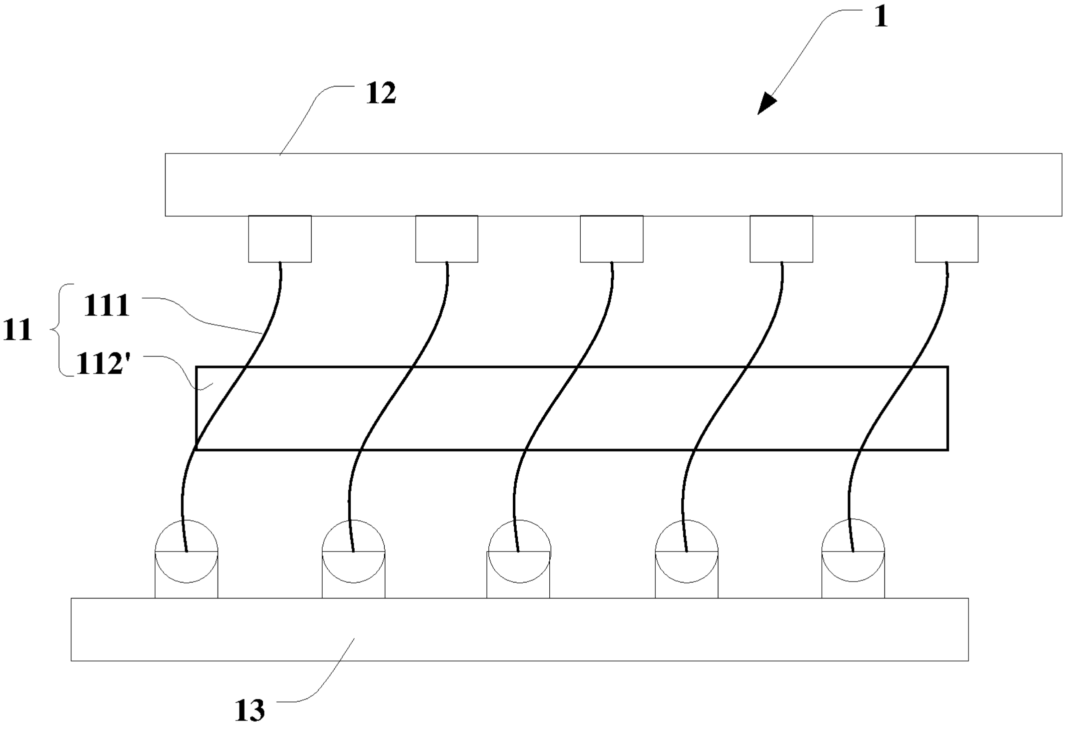
FIG. 1 is a schematic diagram of a structure of an electronic assembly.

For ease of understanding of an electronic assembly and an electronic device provided in embodiments of this application, the following first describes an application scenario of the electronic assembly and the electronic device. Production and life in today's society cannot be separated from an electronic device. The electronic device usually includes an electronic component and a circuit board, and an electrical connector is usually used to connect electronic components, connect the electronic component and the circuit board, and connect circuit boards. FIG. 1 is a schematic diagram of a structure of an electronic assembly. As shown in FIG. 1, an electronic assembly 1 includes an electrical connector 11, a first electronic component 12, and a second electronic component 13, and the electrical connector 11 is located between the first electronic component 12 and the second electronic component 13. The electrical connector 11 includes a plurality of terminals 111 and a fastening board 112' configured to fasten the terminal 111, and two ends of the terminal 111 respectively correspond to a pad of the first electronic component 12 and a pad of the second electronic component 13. After being pressed by an external force, the terminal 111 of the electrical connector 11 is electrically connected to a pad on a surface layer of the first electronic component 12 and a pad on a surface layer of the second electronic component 13, to implement a signal transmission function and a power supply function.

In the conventional technology, a spacing between the terminals 111 is usually increased, to reduce signal crosstalk between the terminals 111. Consequently, a density of the terminals 111 of the electrical connector is low. Therefore, a density of pins of an electronic component connected by using the electrical connector cannot be increased. Especially, a signal with a higher transmission rate requires a larger spacing between the terminals 111. This is contrary to a current miniaturization requirement of the electronic device. A metal plate may be disposed between the terminals 111, to implement electromagnetic isolation, so that the spacing between the terminals 111 is reduced. However, in a solution of disposing the metal plate, a structure of the electrical connector is complex, and manufacturing costs are high. To resolve the foregoing technical problem, this application provides an electronic assembly and an electronic device. The following describes the technical solutions of this application in detail with reference to the accompanying drawings and embodiments.

Figure 2:
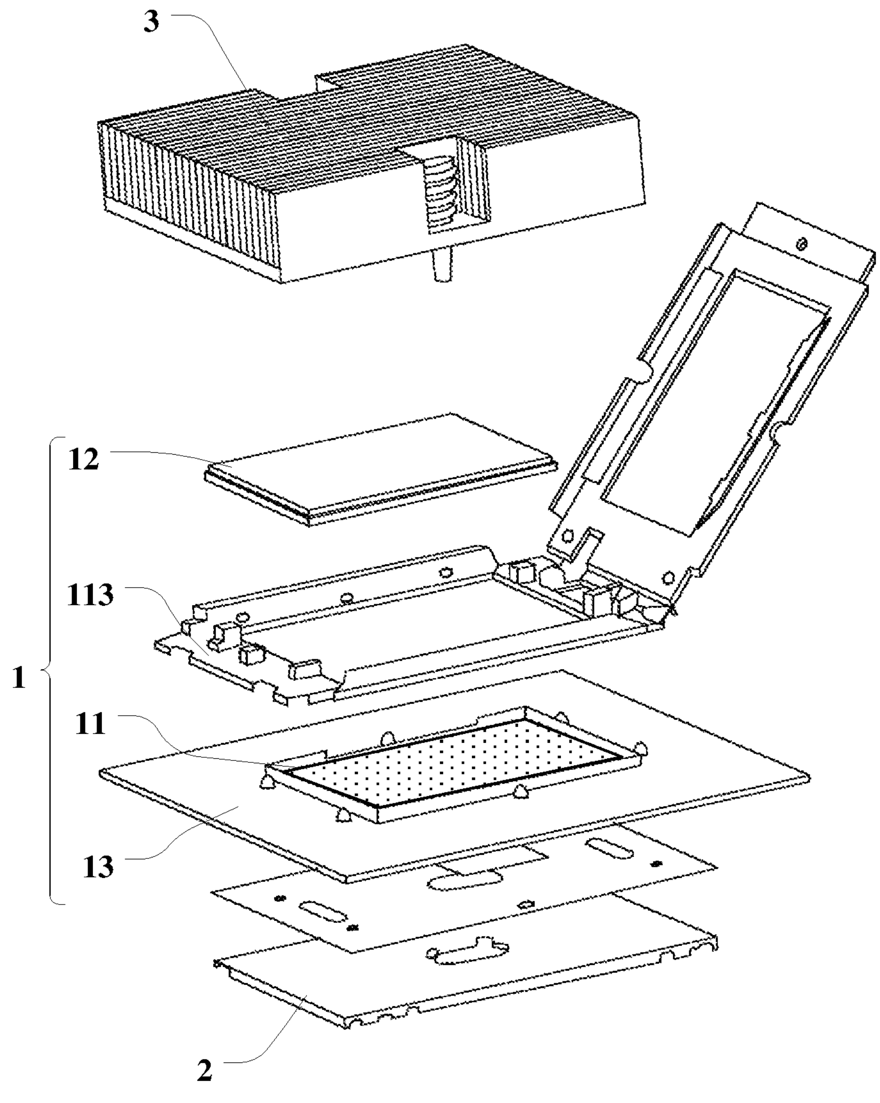
FIG. 2 is a schematic diagram of a partial structure of an electronic device according to an embodiment of this application.

First, this application provides an electronic device. FIG. 2 is a schematic diagram of a partial structure of an electronic device 20 according to an embodiment of this application. As shown in FIG. 2, the electronic device 20 includes a housing 2, a power module 4, and an electronic assembly 1. The electronic assembly 1 and the power module 4 are disposed on the housing 2. The power module 4 is electrically connected to the electronic assembly 1, to implement electrical transmission of the electronic assembly. In a specific embodiment, a specific type of the power module 4 is not limited, and the power module 4 may include a battery; or the power module 4 includes a power input/output interface, configured to be connected to an external power supply device. It should be noted that, that the electronic assembly 1 is disposed on the housing 2 herein does not necessarily mean that the electronic assembly 1 is directly fastened on the housing 2. Alternatively, the electronic assembly 1 may be fastened on the housing 2 by using another mechanical part. A plurality of electronic assemblies 1 in the electronic device 20 help implement a function of the electronic device. A specific type of the electronic device is not limited in this application. For example, the electronic device 20 may include a computing device (for example, a server), a network device (for example, a switch), a storage device (for example, a storage array), a vehicle-mounted device (for example, a vehicle-mounted sound box or a vehicle-mounted navigational instrument), and a terminal device (such as a wearable device, a computer, a mobile phone, or a tablet computer). Any electronic assembly 1 that is connected by using the electrical connector 11 falls within the protection scope of the technical solutions of this application.

Refer to FIG. 2. In an embodiment, the electronic assembly 1 is installed on the housing 2 of the electronic device 20, and the electronic assembly 1 may include an electrical connector 11, a first electronic component 12, and a second electronic component 13. The electrical connector 11 is connected between the first electronic component 12 and the second electronic component 13. In other words, the first electronic component 12 and the second electronic component 13 are electrically connected by using the electrical connector 11.

Figure 3:
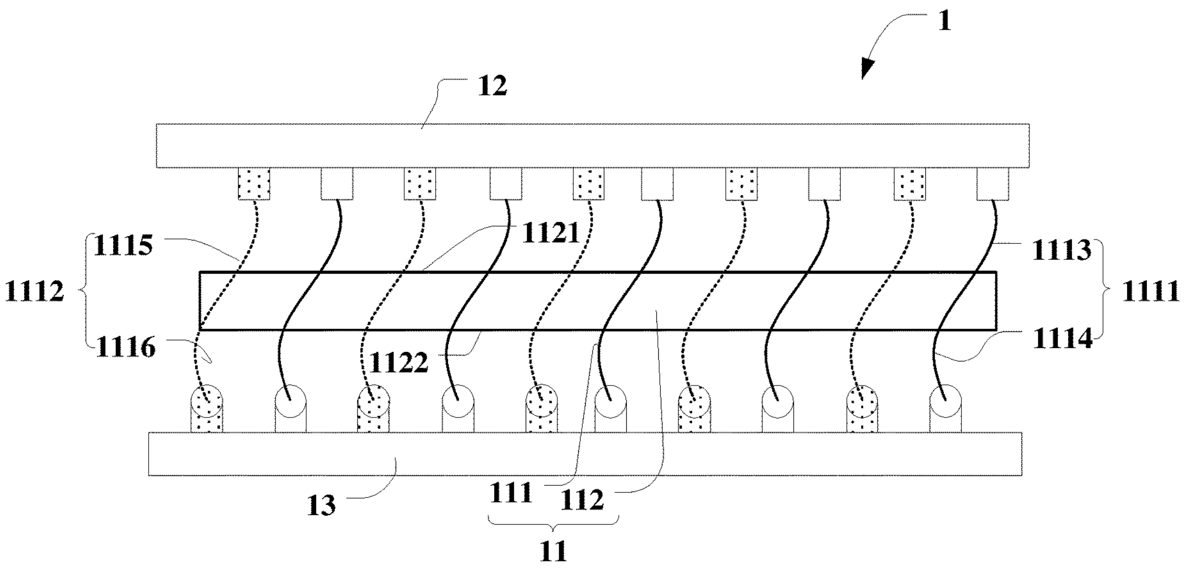
FIG. 3 is a schematic diagram of a structure of an electronic assembly according to an embodiment of this application.

FIG. 3 is a schematic diagram of a structure of an electronic assembly according to an embodiment of this application. As shown in FIG. 3, the electrical connector 11 includes a terminal 111 and a first multilayer circuit board 112, and the terminal 111 is fastened on the first multilayer circuit board 112. The terminal 111 may include a signal terminal 1111. The signal terminal 1111 is electrically connected to a signal interface of an electronic component, and is configured to transmit a signal. Specifically, one end of the signal terminal 1111 is electrically connected to a signal interface of the first electronic component 12, and the other end is electrically connected to a signal interface of the second electronic component 13, to implement signal transmission between the first electronic component 12 and the second electronic component 13.

Figure 4:
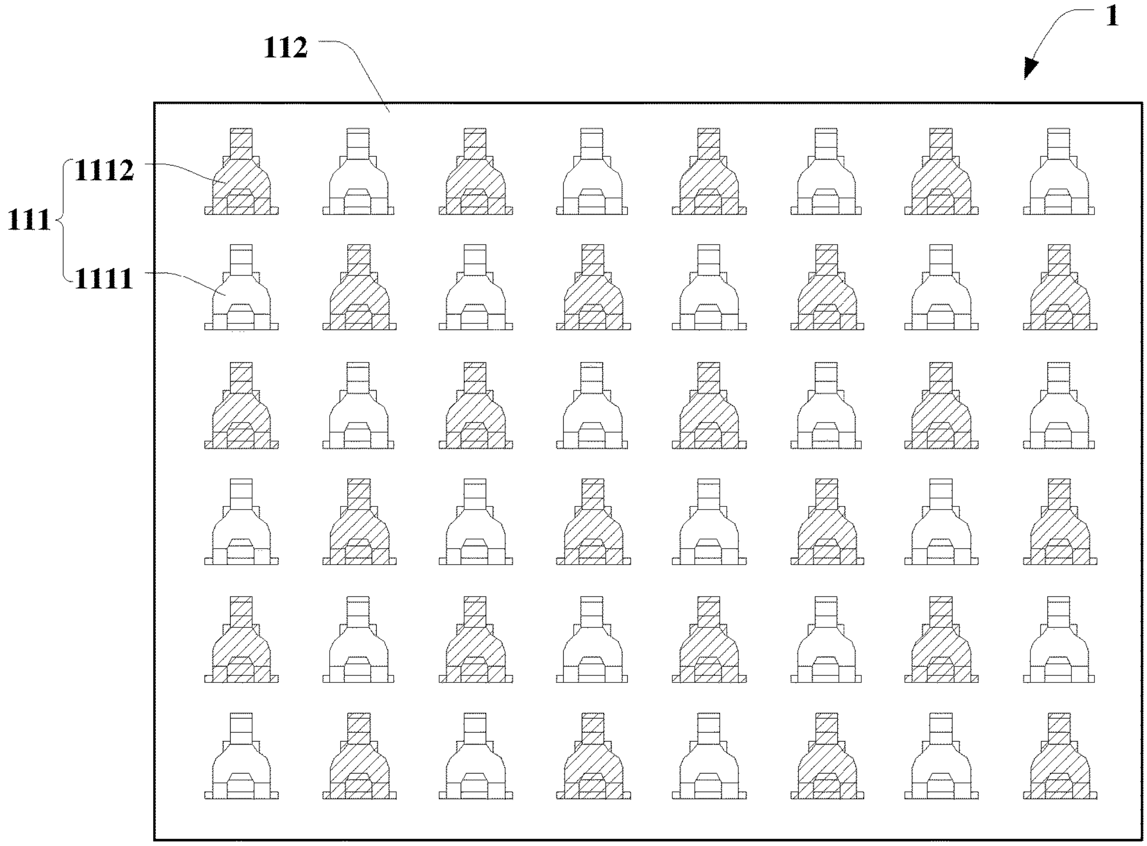
FIG. 4 is a schematic diagram of a top-view structure of an electrical connector according to an embodiment of this application.

FIG. 4 is a schematic diagram of a top-view structure of an electrical connector according to an embodiment of this application. As shown in FIG. 4, terminals 111 of the electrical connector 11 are arranged in a planar shape. The terminals 111 in FIG. 4 are arranged in an array. In an actual application, this is not limited in this application, and specific locations of the terminals 111 may be arranged based on an actual product requirement. With reference to FIG. 3 and FIG. 4, the terminal 111 of the electrical connector 11 further includes a ground terminal 1112. In the signal terminals 1111, signal terminals 1111 configured to transmit a same signal are considered as one group of signal terminals. Herein, one group of signal terminals may include one signal terminal 1111, or may include at least two signal terminals 1111. A quantity of signal terminals in each group is not limited in this application. At least one ground terminal 1112 is disposed between any two adjacent groups of signal terminals, and is configured to shield signal cross-talk. To be specific, ground terminals 1112 are disposed around each group of signal terminals used to transmit a signal, so that the ground terminals 1112 may be used as a shielding wall of the signal terminal 1111. In this case, an interference signal generated by a signal terminal 1111 located within the shielding wall enclosed by the ground terminals 1112 is located within the shielding wall, and does not easily interfere with another signal terminal 1111; and another external interference signal does not easily enter the shielding wall, and the signal terminal 1111 within the shielding wall does not easily receive the interference signal. Therefore, in the technical solutions of this application, crosstalk does not easily occur between signal terminals 1111. This helps improve a signal transmission rate of the electrical connector 11, and helps reduce a spacing between groups of signal terminals 1111, to improve a density of the signal terminals 1111, implement miniaturization of the electronic assembly 1, and promote miniaturization of the electronic device 20.

In a specific embodiment, as shown in FIG. 2, the first electronic component 12 may be a chip, the second electronic component 13 may be a main board, and the main board may also be understood as a circuit board. The electrical connector 11 in this solution may be a chip slot. Still refer to FIG. 2. The electrical connector 11 may further include a frame body 113, and the frame body 113 is connected between the main board and the chip, to fasten the chip and the main board. In addition, the electronic device 20 may further include a heat sink 3, and the heat sink 3 is disposed on a side that is of the chip and that is away from the main board, so that the heat sink 3 can dissipate heat for the chip.

In a specific embodiment, as shown in FIG. 2, the first electronic component 12 may be a chip, the second electronic component 13 may be a main board, and the main board may also be understood as a circuit board. The electrical connector 11 in this solution may be a chip slot. Still refer to FIG. 2. The electrical connector 11 may further include a frame body 113, and the frame body 113 is connected between the main board and the chip, to fasten the chip and the main board. In addition, the electronic device may further include a heat sink 3, and the heat sink 3 is disposed on a side that is of the chip and that is away from the main board, so that the heat sink 3 can dissipate heat for the chip.

Refer to FIG. 3. The first multilayer circuit board 112 includes a first side surface 1121 and a second side surface 1122 that are opposite to each other, the signal terminal 1111 includes a first signal terminal portion 1113 extending out of the first side surface 1121 and a second signal terminal portion 1114 extending out of the second side surface 1122, and the ground terminal 1112 includes a first ground terminal portion 1115 extending out of the first side surface 1121 and a second ground terminal portion 1116 extending out of the second side surface 1122. In the embodiment shown in FIG. 3, the first signal terminal portion 1113 and the second signal terminal portion 1114 are of an integral structure, and the first ground terminal portion 1115 and the second ground terminal portion 1116 are of an integral structure.

Figure 5:
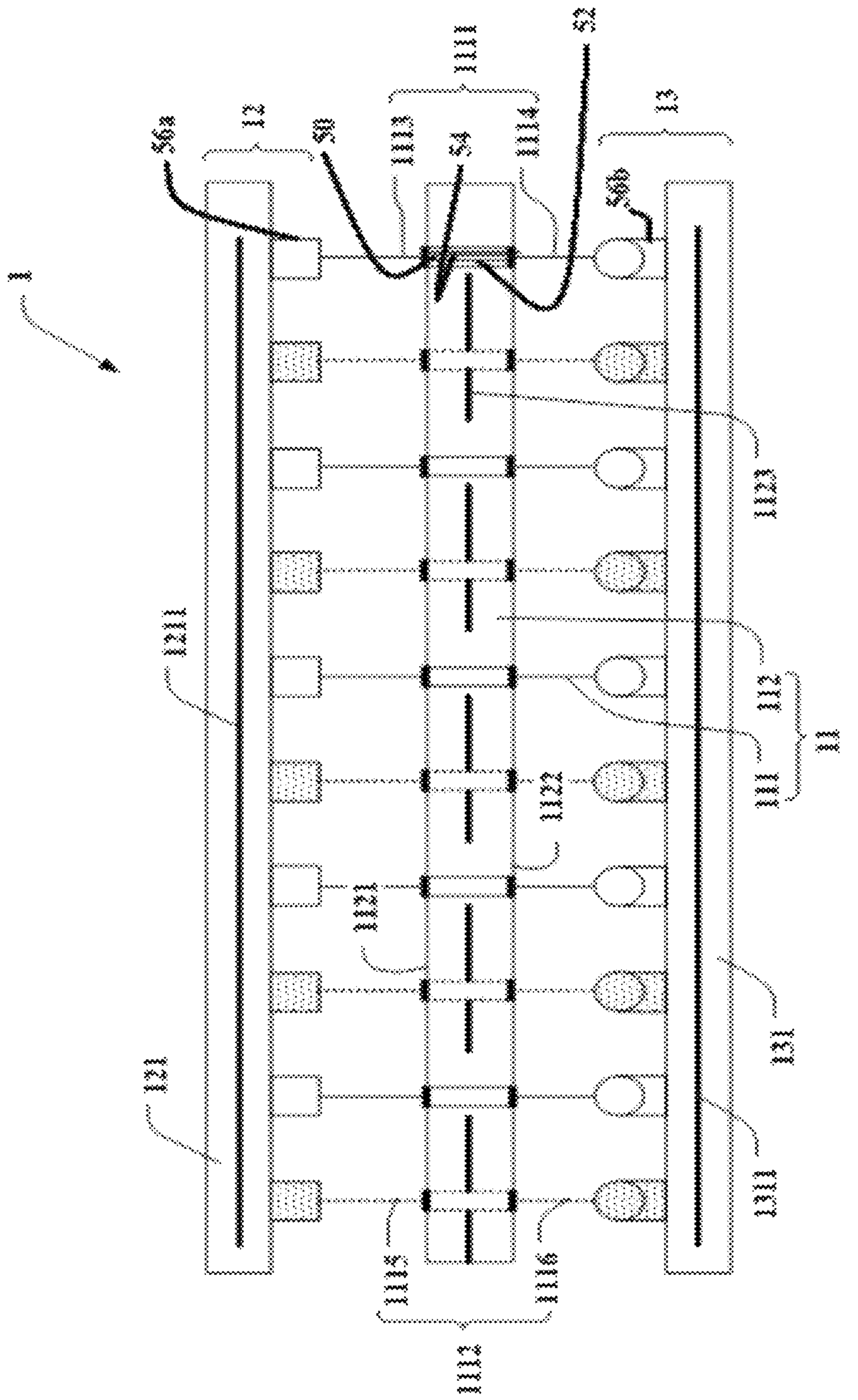
FIG. 5 is a schematic diagram of another structure of an electronic assembly according to an embodiment of this application.

FIG. 5 is a schematic diagram of another structure of an electronic assembly according to an embodiment of this application. As shown in FIG. 5, in another embodiment, the first signal terminal portion 1113 and the second signal terminal portion 1114 may alternatively be of a split structure, but the first signal terminal portion 1113 and the second signal terminal portion 1114 are electrically connected in a region in which the first multilayer circuit board 112 is located. Similarly, the first ground terminal portion 1115 and the second ground terminal portion 1116 may also be of a split structure, but the first signal terminal portion 1113 and the second signal terminal portion 1114 are electrically connected in a region in which the first multilayer circuit board 112 is located. In this embodiment of this application, a manner in which the first signal terminal portion 1113 and the second signal terminal portion 1114 are electrically connected is not limited, and a manner in which the first ground terminal portion 1115 and the second ground terminal portion 1116 are electrically connected is not limited either.

In a specific embodiment, as shown in FIG. 5, the first multilayer circuit board 112 may be specifically a four-layer circuit board or a circuit board including more layers. This is not limited in this application. The first signal terminal portion 1113 and the second signal terminal portion 1114 are implemented by using the first multilayer circuit board 112. For example, the first signal terminal portion 1113 and the second signal terminal portion 1114 may be connected by using internal cabling 50 in the multilayer circuit board in cooperation with a conductive through hole or a conductive blind hole 52. In this manner, the first signal terminal portion 1113 and the second signal terminal portion 1114 may not be opposite in a direction perpendicular to the first multilayer circuit board 112, and locations of the first signal terminal portion 1113 and the second signal terminal portion 1114 may be designed based on an actual requirement; or a conductive through hole or a conductive blind hole 52 may be directly disposed on the multilayer circuit board, to implement an electrical connection of the terminal 111. As shown in FIG. 5, an inner wall 54 of the conductive through hole 52 has a conductive layer. For example, the conductive through hole 52 has a metal inner wall. In addition, two ends of the conductive through hole each are provided with a pad **56*a*, 56*b*, and each pad 56*a*, 56*b* is electrically connected to the metal inner wall 54. The first signal terminal portion 1113 is connected to pad 56*a* and the second signal terminal portion 1114 is connected to pad 56*b* at each end of the conductive through hole 52, so that the first signal terminal portion 1113 and the second signal terminal portion 1114 are electrically connected. For example, in a solution shown in FIG. 5, a manufacturing process of the electrical connector 11** in the solution is simple, and a signal loss is small.

Still refer to FIG. 5. The first multilayer circuit board 112 includes at least one layer of first ground copper sheet 1123, and the ground terminal 1112 is electrically connected to the first ground copper sheet 1123. Specifically, the ground terminal 1112 may be electrically connected to the first ground copper sheet 1123 by using a conductive through hole, so that the ground terminal 1112 is grounded. Specifically, the conductive through hole further includes a metal inner wall and a pad electrically connected to the metal inner wall, and the metal inner wall is electrically connected to the first ground copper layer. In this way, the conductive through hole is electrically connected, and the ground terminal 1112 can be electrically connected to the first ground copper sheet 1123. The first ground copper sheet 1123 is used as a part of the shielding wall, to improve an interference signal shielding effect of the electrical connector 11.

In addition, still refer to FIG. 5. The first electronic component 12 includes a second multilayer circuit board 121. Similarly, the second multilayer circuit board 121 may be specifically a four-layer circuit board or a circuit board including more layers. This is not limited in this application. The second multilayer circuit board 121 also includes at least one layer of second ground copper sheet 1211 and a conductive through hole electrically connected to the second ground copper sheet 1211. The ground terminal 1112 of the electrical connector 11 is electrically connected to the second ground copper sheet 1211 by using the conductive through hole, so that the ground terminal 1112 is grounded, and the second ground copper sheet 1211 may be used as a part of the shielding wall, to improve the interference signal shielding effect of the electrical connector 11.

Figure 6:
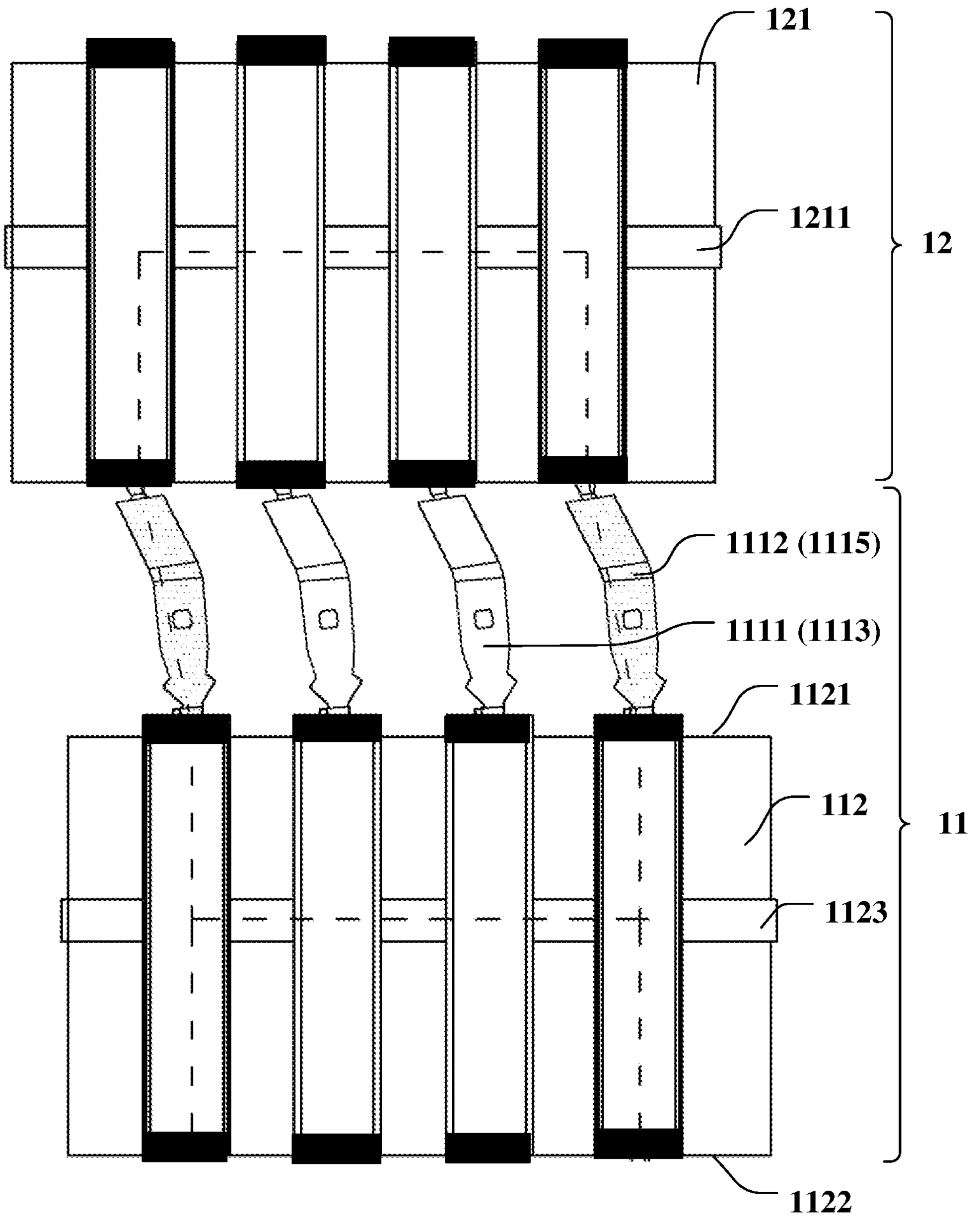
FIG. 6 is an enlarged schematic diagram of a partial structure of an electronic assembly according to an embodiment of this application.

FIG. 6 is an enlarged schematic diagram of a partial structure of an electronic assembly according to an embodiment of this application. As shown in FIG. 6, the electrical connector 11 includes a first multilayer circuit board 112, and the first multilayer circuit board 112 includes at least one layer of first ground copper sheet 1123. The first electronic component 12 includes a second multilayer circuit board 121, and the second multilayer circuit board 121 includes at least one layer of second ground copper sheet 1211. The ground terminal 1112 of the electrical connector 11 is electrically connected to the first ground copper sheet 1123 and the second ground copper sheet 1211. In this case, the ground terminal 1112, the first ground copper sheet 1123, and the second ground copper sheet 1211 form a shielding cage surrounding the signal terminal 1111. Therefore, the signal terminal 1111 located in the shielding cage may be comprehensively shielded around the signal terminal 1111, to achieve a good crosstalk shielding effect, and help improve a shielding effect of the electronic assembly 1.

Still refer to FIG. 5. The second electronic component 13 includes a third multilayer circuit board 131. Similarly, the third multilayer circuit board 131 may be specifically a four-layer circuit board or a circuit board including more layers. This is not limited in this application. The third multilayer circuit board 131 includes at least one layer of third ground copper sheet 1311 and a conductive through hole electrically connected to the second ground copper sheet 1211. The ground terminal 1112 of the electrical connector 11 is electrically connected to the third ground copper sheet 1311 by using the conductive through hole. In this way, the ground terminal 1112 is grounded, and the third ground copper sheet 1311 is used as a part of the shielding wall, to improve an interference signal shielding effect of the electrical connector 11.

Figure 7:
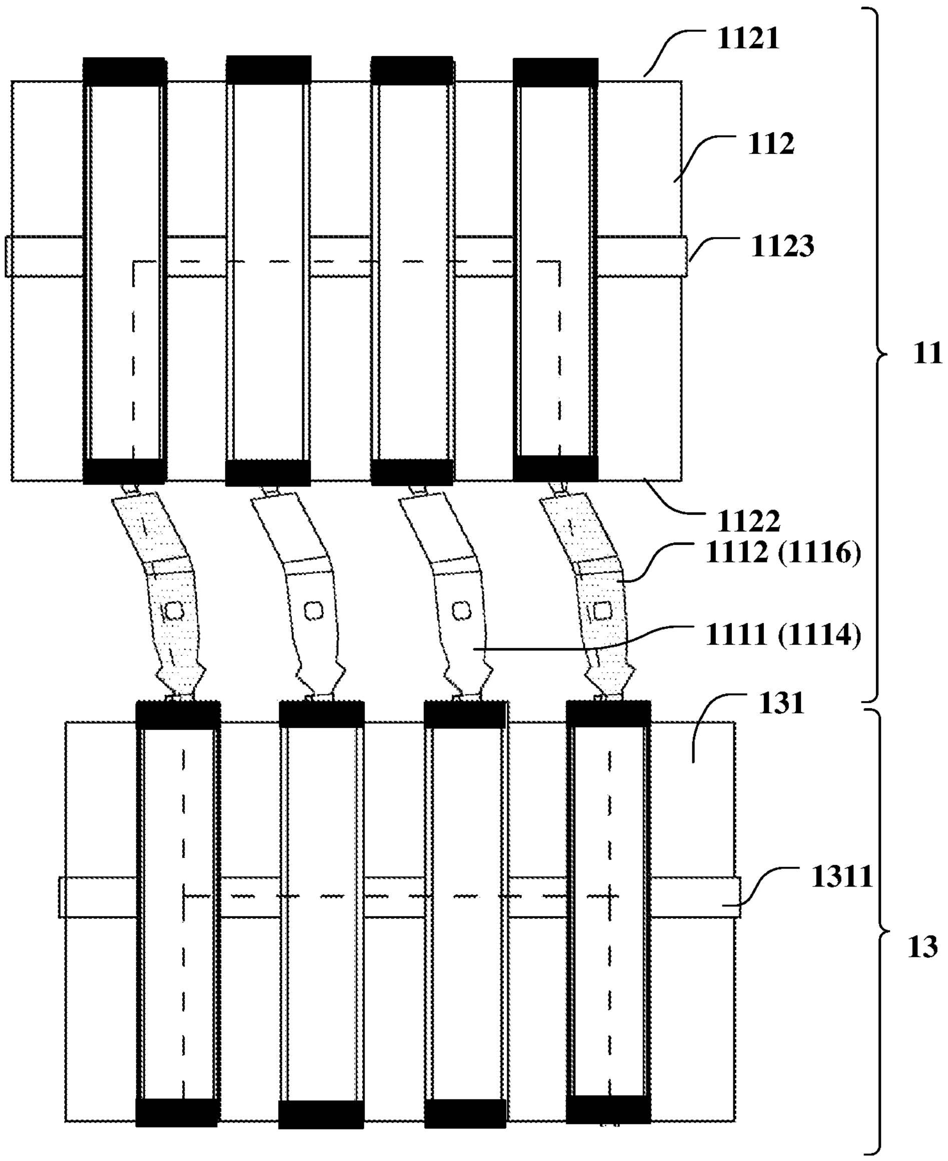
FIG. 7 is another enlarged schematic diagram of a partial structure of an electronic assembly according to an embodiment of this application.

FIG. 7 is another enlarged schematic diagram of a partial structure of an electronic assembly according to an embodiment of this application. As shown in FIG. 7, the electrical connector 11 includes a first multilayer circuit board 112, and the first multilayer circuit board 112 includes at least one layer of first ground copper sheet 1123. The second electronic component 13 includes a third multilayer circuit board 131, and the third multilayer circuit board 131 includes at least one layer of third ground copper sheet 1311. The ground terminal 1112 of the electrical connector 11 is electrically connected to the first ground copper sheet 1123 and the third ground copper sheet 1311. In this case, the ground terminal 1112, the first ground copper sheet 1123, and the third ground copper sheet 1311 form a shielding cage surrounding the signal terminal 1111. Therefore, the signal terminal 1111 located in the shielding cage may be comprehensively shielded, to achieve a good crosstalk shielding effect, and help improve a shielding effect of the electronic assembly 1.

Figure 8:
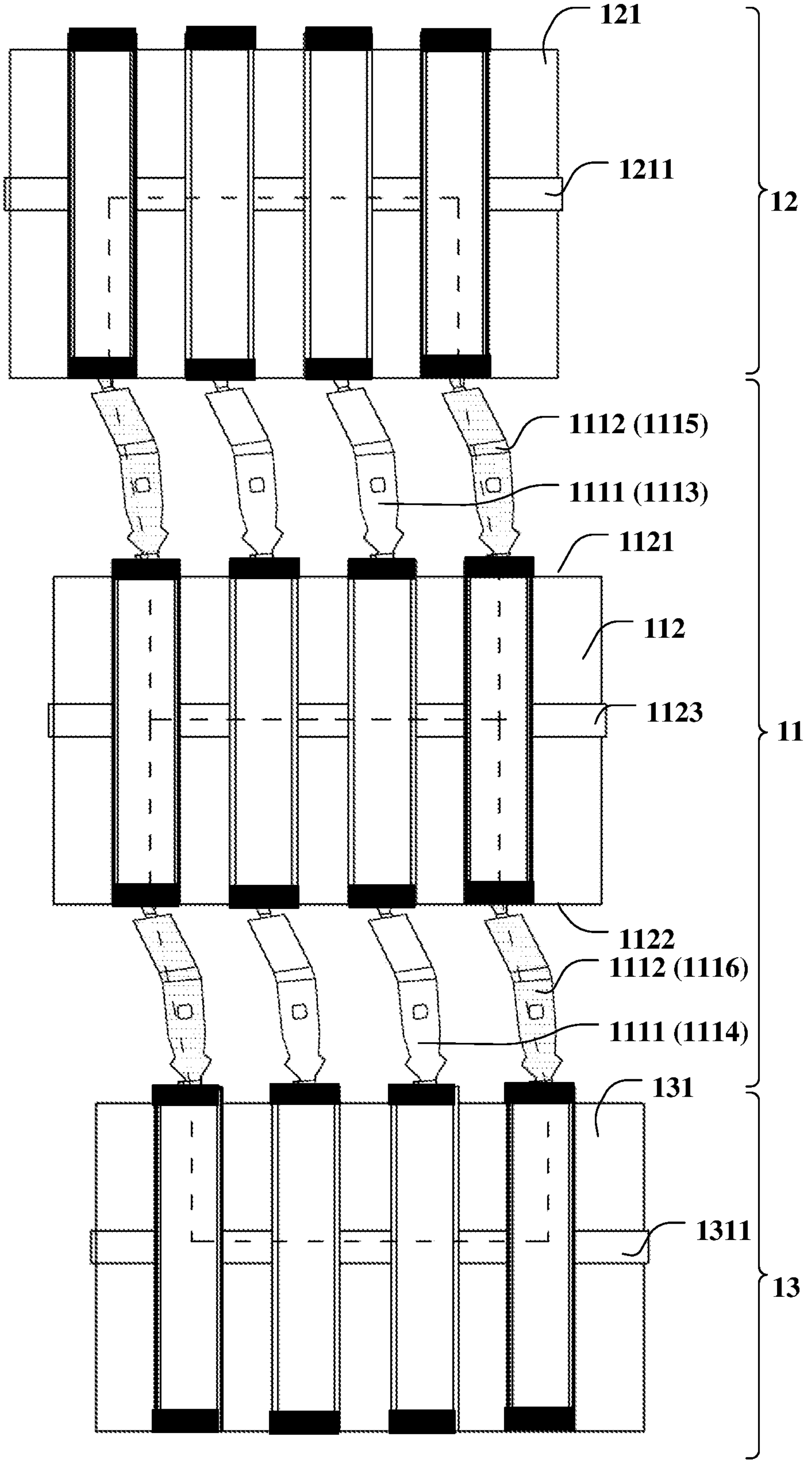
FIG. 8 is another enlarged schematic diagram of a partial structure of an electronic assembly according to an embodiment of this application.

FIG. 8 is another enlarged schematic diagram of a partial structure of an electronic assembly according to an embodiment of this application. As shown in FIG. 8, the electrical connector 11 includes a first multilayer circuit board 112, and the first multilayer circuit board 112 includes at least one layer of first ground copper sheet 1123. The first electronic component 12 includes a second multilayer circuit board 121, and the second multilayer circuit board 121 includes at least one layer of second ground copper sheet 1211. The second electronic component 13 includes a third multilayer circuit board 131, the third multilayer circuit board 131 includes at least one layer of third ground copper sheet 1311, and the ground terminal 1112 of the electrical connector 11 is electrically connected to the third ground copper sheet 1311. In this solution, the electronic assembly 1 may form a shielding cage on two sides of the electrical connector 11. This effectively reduces crosstalk of the signal terminal 1111, improves a signal transmission rate of the electrical connector 11, and helps reduce a spacing between groups of signal terminals 1111, to improve a density of the signal terminals 1111, implement miniaturization of the electronic assembly 1, and promote miniaturization of the electronic device. The technical solution breaks through a conventional shielding idea, high-density and miniaturization evolution of a chip is not affected, and manufacturing and assembly are easy.

In a specific embodiment, the first electronic component 12 is a chip, and the second electronic component 13 is a main board. A large quantity of digital signals such as a high-speed signal, a clock signal, and an input/output signal need to be transmitted between the chip and the main board, and a power signal is further required. The structure of the electronic assembly 1 in the foregoing embodiment is used for the chip and the main board, to achieve a good shielding effect for the signal terminal 1111, so that signal integrity of a full link including the chip, the electrical connector 11, and the main board is achieved, signal transmission quality is improved, and a speed of the chip can be improved. For example, the speed of the chip can be increased to 32G, 56G, or even 112G.

Figure 9:
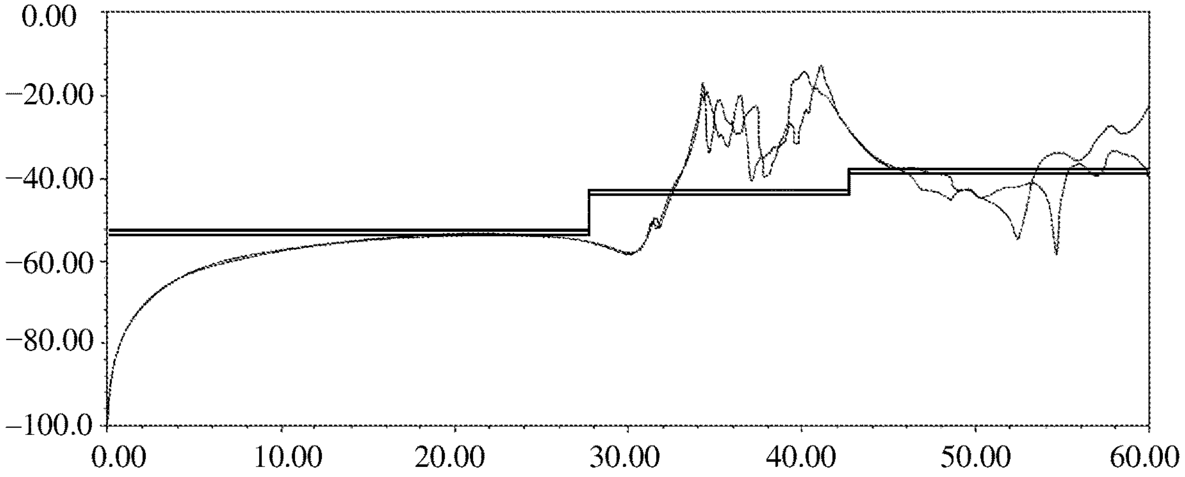
FIG. 9 is a schematic diagram of signal crosstalk between signal terminals of an electronic assembly in the conventional technology.
Figure 10:
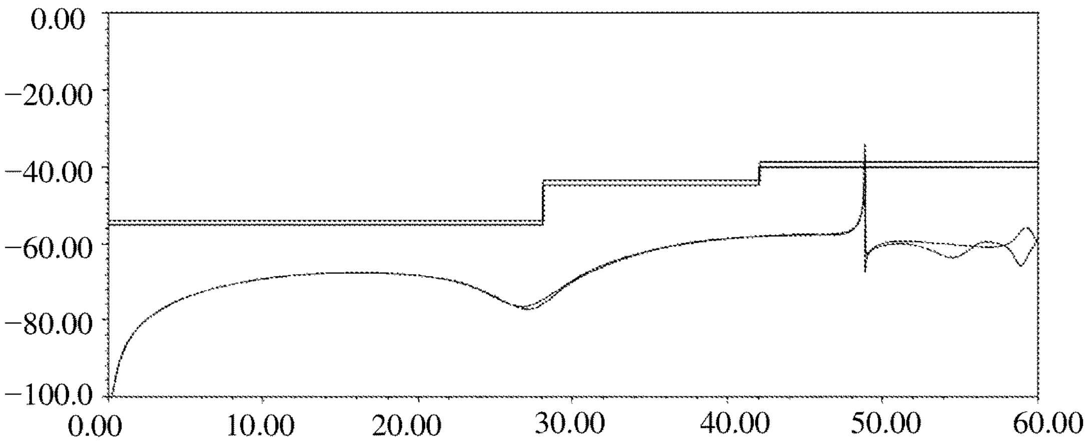
FIG. 10 is a schematic diagram of signal crosstalk between signal terminals of an electronic assembly according to an embodiment of this application.

FIG. 9 is a schematic diagram of signal crosstalk between signal terminals of an electronic assembly in the conventional technology. In the figure, a horizontal coordinate is a resonance frequency, and a unit is GHz; and a vertical coordinate is crosstalk. As shown in FIG. 9, signal crosstalk of an electronic assembly 1 including a chip, an electrical connector, and a main board in the conventional technology is obvious. In addition, a step line in the figure is a threshold of a crosstalk value between signal terminals 1111. In other words, when the crosstalk value between the signal terminals 1111 exceeds the threshold, normal transmission of a high-speed signal is affected, and in a severe case, normal operation of the chip is affected, or even the chip is damaged. As shown in FIG. 9, when the speed of the chip reaches 32G, the crosstalk value between the signal terminals 1111 exceeds the threshold, and a resonance point occurs. Therefore, signal crosstalk between the terminals 111 limits an increase in the speed of the chip. After the technical solution of this application is used, a shielding cage surrounding the signal terminal 1111 may be formed on two sides of the electrical connector 11, to reduce crosstalk signals between the signal terminals 1111. FIG. 10 is a schematic diagram of signal crosstalk between signal terminals of an electronic assembly according to an embodiment of this application. In the figure, a horizontal coordinate is a resonance frequency, and a unit is GHz; and a vertical coordinate is crosstalk. As shown in FIG. 10, in the technical solution of this application, signal crosstalk between signal terminals 1111 is greatly reduced, and is below a threshold, to help improve the speed of the chip.

Figure 11:
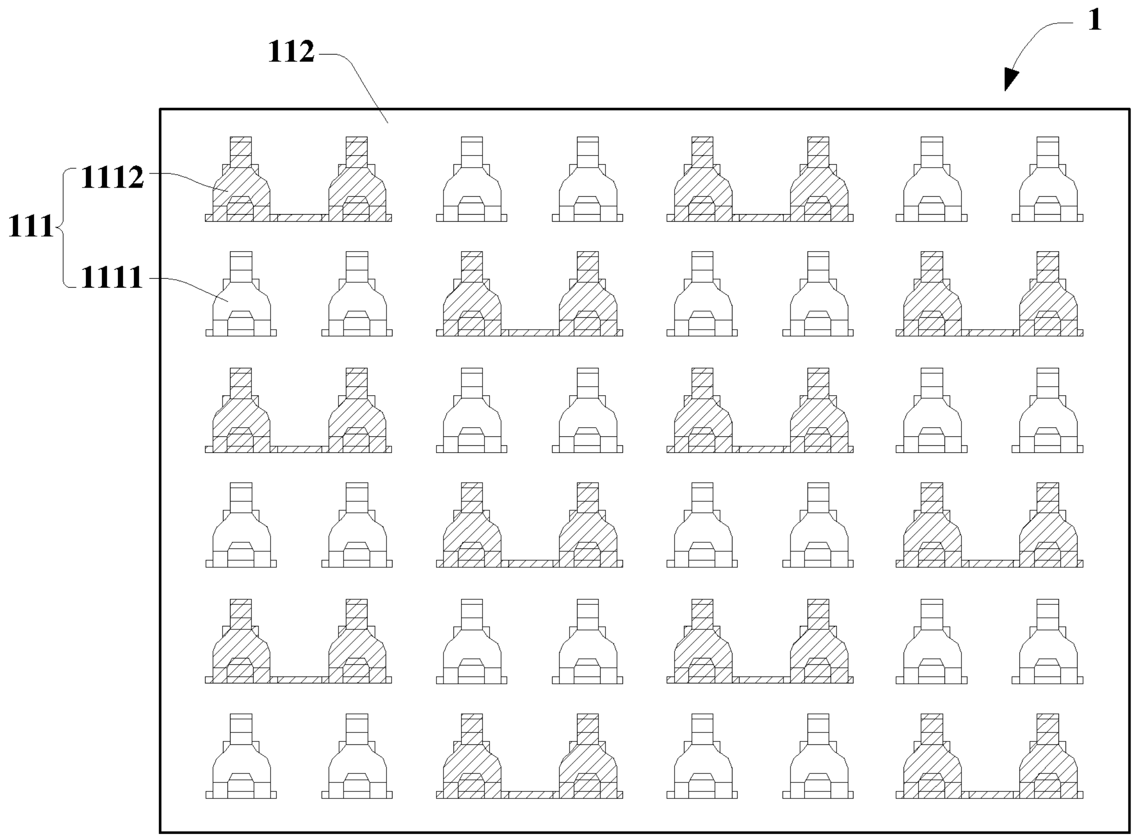
FIG. 11 is another schematic diagram of a top-view structure of an electrical connector according to an embodiment of this application.

FIG. 11 is another schematic diagram of a top-view structure of an electrical connector according to an embodiment of this application. As shown in FIG. 11, in a specific embodiment, the one group of signal terminals 1111 may include two differential signal terminals, and at least one ground terminal 1112 is disposed between any two adjacent groups of differential signal terminals. In addition to resolving the problem that a transmit reference point and a receive reference point have different potentials, the differential signal has a stronger anti-interference capability than a single terminal signal. An anti-interference principle of a differential terminal is as follows: Noise of two single-terminal signals is canceled with each other during differential detection. Provided that external interference to the two single-terminal signals in a differential pair is basically the same, transmission of the differential signal is not affected. Therefore, in the technical solution of this application, the electrical connector 11 transmits a signal by using two differential signal terminals, to improve an anti-interference capability of the electrical connector 11, and further improve a signal transmission rate of the electrical connector 11.

As shown in FIG. 11, in a specific embodiment, any adjacent ground terminals 1112 are electrically connected. In this solution, when ground terminals 1112 are adjacent, the adjacent ground terminals 1112 are electrically connected, so that the adjacent ground terminals 1112 can form an entire shielding wall, to improve a shielding effect of the ground terminal 1112. Especially, when a differential signal terminal is electrically connected, the ground terminal 1112 may completely enclose the differential signal terminal, to improve a shielding effect of the shielding wall including the ground terminal 1112 for the differential signal terminal.

Figure 12:
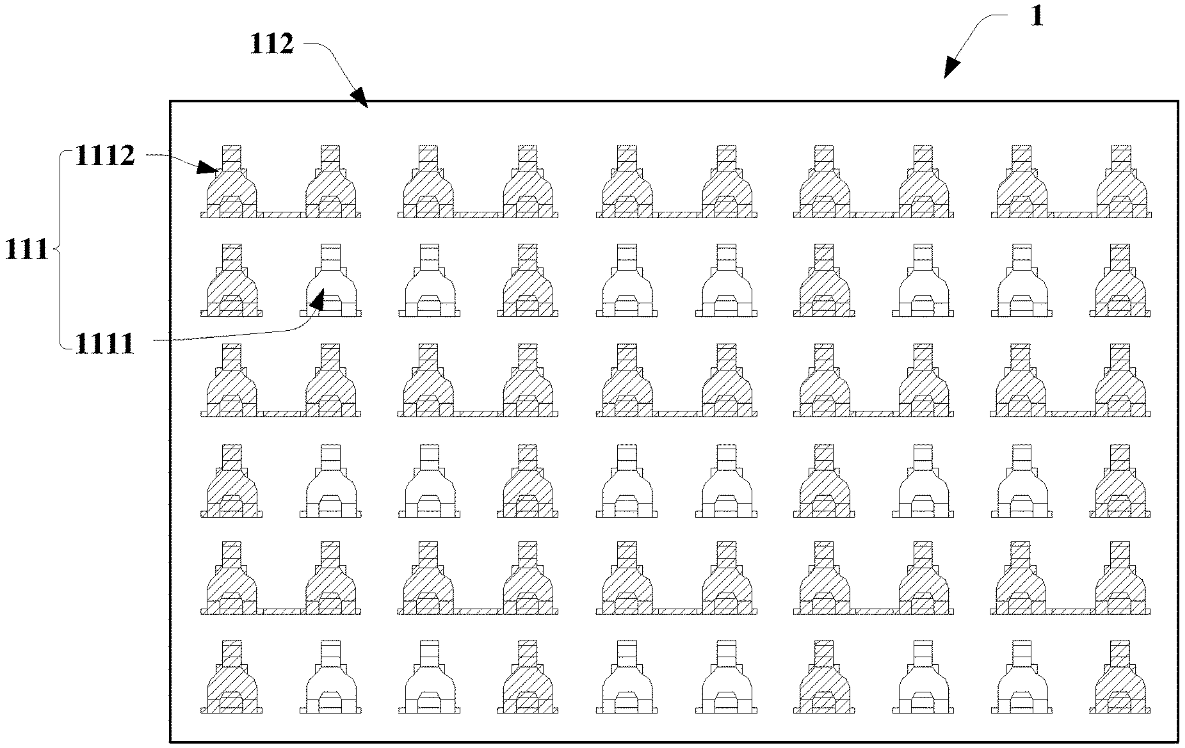
FIG. 12 is another schematic diagram of a top-view structure of an electrical connector according to an embodiment of this application.

FIG. 12 is another schematic diagram of a top-view structure of an electrical connector according to an embodiment of this application. In a specific embodiment shown in FIG. 12, ground terminals 1112 may be disposed in a row, and a ground terminal 1112 is disposed between differential signal terminals in a row in which the differential signal terminals are disposed. In this solution, a shielding cage may also be formed, and a distance between differential signal terminals is large, so that a shielding effect is good. In conclusion, a terminal layout manner may be selected based on an actual structure of the terminal of the electrical connector 11.

As shown in FIG. 4, when a terminal of the electrical connector 11 is specifically disposed, a structure of the ground terminal 1112 may be the same as a structure of the signal terminal 1111, provided that in a connection, the signal terminal 1111 is electrically connected to a signal interface, and the ground terminal 1112 is electrically connected to the ground. In this solution, the structure of the ground terminal 1112 is the same as the structure of the signal terminal 1111, so that the structure of the terminal of the electrical connector 11 is simplified, and a manufacturing process of the electrical connector 11 is simplified.

Figure 13:
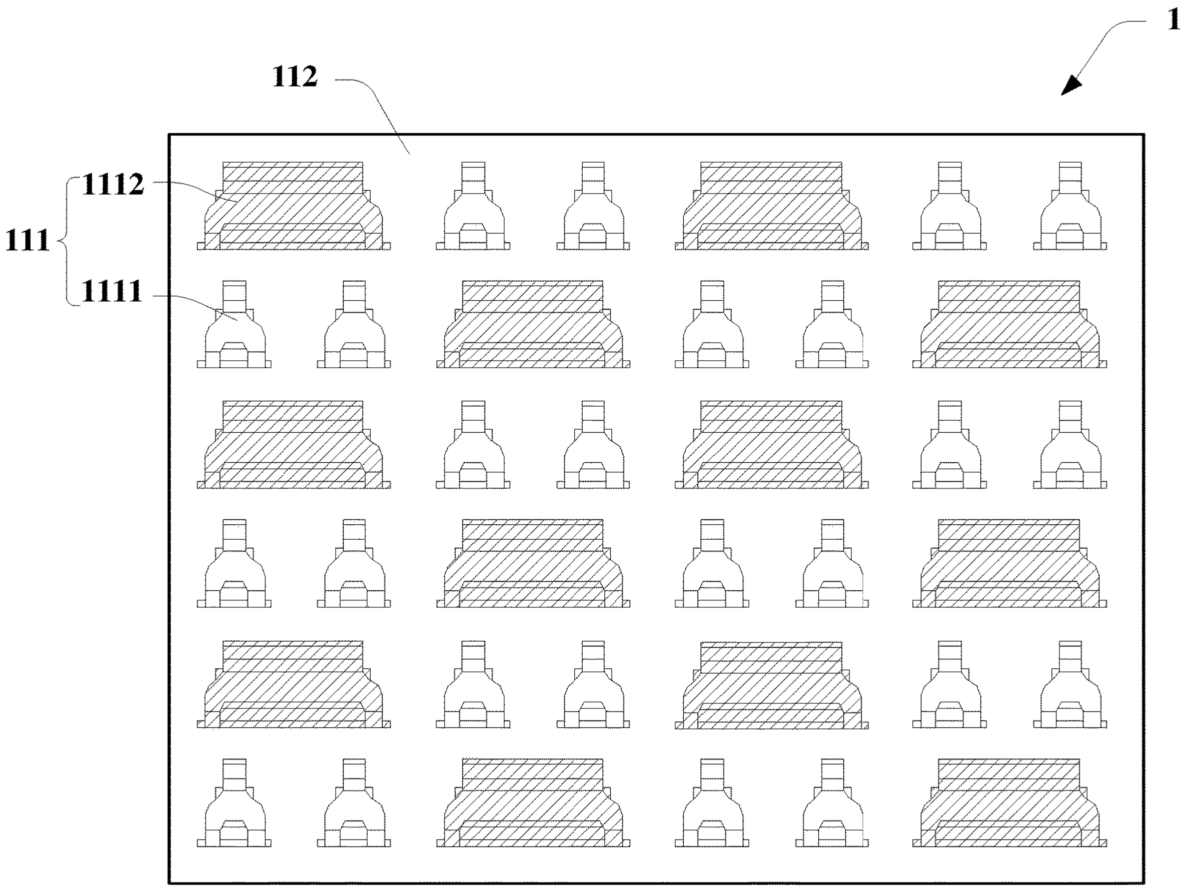
FIG. 13 is another schematic diagram of a top-view structure of an electrical connector according to an embodiment of this application.

FIG. 13 is another schematic diagram of a top-view structure of an electrical connector according to an embodiment of this application. In a specific embodiment shown in FIG. 13, a width H of the ground terminal 1112 is greater than a width h of the signal terminal 1111, to improve a shielding effect of the ground terminal 1112 for the signal terminal 1111. When the signal terminal 1111 is a differential signal terminal, the width H of the ground terminal 1112 may be specifically greater than a sum of widths of the two differential signal terminals, so that one ground terminal 1112 may be used to shield one group of differential signal terminals. Compared with the embodiment in which two ground terminals 1112 are used to shield one group of differential signal terminals, in this embodiment, one ground terminal 1112 with a larger width does not have a gap, and has a better shielding effect. It should be noted that, it can be understood that, a size of the terminal in a direction perpendicular to a surface of the first multilayer circuit board 112 is a length of the terminal, and in a shape of a cross section parallel to the first multilayer circuit board 112, a size of a side with a larger size is a width of the terminal, and a size of a side with a smaller size is a thickness of the terminal.

It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An electronic assembly comprising:

a first electronic component;

a second electronic component; and an electrical connector connecting the first electronic component and the second electronic component, wherein the electrical connector comprises:

a terminal; and a first multilayer circuit board, wherein:

the terminal is fastened on the first multilayer circuit board;

the terminal comprises a plurality of signal terminals and a plurality of ground terminals, each signal terminal is electrically connected to a signal interface of the first electronic component and a signal interface of the second electronic component and is configured to transmit a signal, each signal terminal configured to transmit a same signal form one group of signal terminals, at least one ground terminal is disposed between two adjacent groups of signal terminals and around each group of signal terminals used to transmit a signal, the at least one ground terminals providing a shielding wall for the group of signal terminals surrounded by the shielding wall; and the first multilayer circuit board comprises a layer formed by a first ground copper sheet; and the first electronic component comprises a second multilayer circuit board that comprises a layer formed by a second ground copper sheet, and each ground terminal providing the shielding wall for the group of signal terminals surrounded by the shielding wall is electrically connected to the first ground copper sheet and to the second ground copper sheet and configured to shield interference signals from adjacent signal terminals.

2. The electronic assembly according to claim 1, wherein the second electronic component comprises a third multilayer circuit board, the third multilayer circuit board comprises a layer formed by a third ground copper sheet, and each ground terminal of the electrical connector is further electrically connected to the third ground copper sheet.

3. The electronic assembly according to claim 1, wherein the groups of signal terminals comprise groups of differential signal terminals, with each group of differential signal terminals having two signal terminals transmitting a differential signal, and at least one ground terminal is disposed between two adjacent groups of differential signal terminals.

4. The electronic assembly according to claim 3, wherein two ground terminals are disposed between two adjacent groups of differential signal terminals.

5. The electronic assembly according to claim 1, wherein a structure of the ground terminals is same as a structure of the signal terminals.

6. The electronic assembly according to claim 1, wherein every two adjacent ground terminals are electrically connected.

7. The electronic assembly according to claim 1, wherein a width of each ground terminal is greater than a width of each signal terminal.

8. The electronic assembly according to claim 1, wherein the first electronic component is a chip, and the second electronic component is a main board, and the electrical connector is a chip slot for connecting the chip to the main board.

9. An electronic device comprising:

a power module;

an electronic assembly; and a housing, wherein the power module and the electronic assembly are disposed on the housing, and the power module is electrically connected to the electronic assembly, wherein the electronic assembly comprises:

a first electronic component;

a second electronic component; and an electrical connector connecting the first electronic component and the second electronic component, wherein the electrical connector comprises:

a terminal; and a first multilayer circuit board, wherein:

the terminal is fastened on the first multilayer circuit board;

the terminal comprises a plurality of signal terminals and a plurality of ground terminals, each signal terminal is electrically connected to a signal interface of the first electronic component and a signal interface of the second electronic component and is configured to transmit a signal, each signal terminal configured to transmit a same signal form one group of signal terminals, at least one ground terminal is disposed between two adjacent groups of signal terminals and around each group of signal terminals used to transmit a signal, the at least one ground terminals providing a shielding wall for the group of signal terminals surrounded by the shielding wall; and the first multilayer circuit board comprises a layer formed by a first ground copper sheet; and the first electronic component comprises a second multilayer circuit board that comprises a layer formed by a second ground copper sheet, and each ground terminal providing the shielding wall for the group of signal terminals surrounded by the shielding wall is electrically connected to the first ground copper sheet and to the second ground copper sheet and configured to shield interference signals from adjacent signal terminals.

10. The electronic device according to claim 9, wherein the second electronic component comprises a third multilayer circuit board, the third multilayer circuit board comprises a layer formed by a third ground copper sheet, and each ground terminal of the electrical connector is further electrically connected to the third ground copper sheet.

11. The electronic device according to claim 9, wherein the groups of signal terminals comprise groups of differential signal terminals, with each group of differential signal terminals having two signal terminals transmitting a differential signal, and at least one ground terminal is disposed between two adjacent groups of differential signal terminals.

12. The electronic device according to claim 11, wherein two ground terminals are disposed between two adjacent groups of differential signal terminals.

13. The electronic device according to claim 9, wherein a structure of the ground terminals is same as a structure of the signal terminals.

14. The electronic device according to claim 9, wherein every two adjacent ground terminals are electrically connected.

15. The electronic device according to claim 9, wherein a width of each ground terminal is greater than a width of each signal terminal.

16. The electronic device according to claim 9, wherein the first electronic component is a chip, and the second electronic component is a main board, and the electrical connector is a chip slot for connecting the chip to the main board.

17. An electronic assembly comprising:

a first electronic component;

a second electronic component; and an electrical connector connecting the first electronic component and the second electronic component, wherein the electrical connector comprises:

a terminal; and a first multilayer circuit board, wherein:

the terminal is fastened on the first multilayer circuit board;

the terminal comprises a plurality of signal terminals and a plurality of ground terminals, each signal terminal is electrically connected to a signal interface of the first electronic component and a signal interface of the second electronic component and is configured to transmit a signal, each signal terminal configured to transmit a same signal form one group of signal terminals, at least one ground terminal is disposed between two adjacent groups of signal terminals and around each group of signal terminals used to transmit a signal, and the first multilayer circuit board comprises a layer formed by a first ground copper sheet; and the first electronic component comprises a second multilayer circuit board that comprises a layer formed by a second ground copper sheet;

each ground terminal is electrically connected to the first ground copper sheet and to the second ground copper sheet, wherein the first ground terminal, first ground copper sheet and second ground copper sheet form a shielding cage surrounding each signal terminal to shield interference signals from adjacent signal terminals; and the second electronic component comprises a third multilayer circuit board, the third multilayer circuit board comprises a layer formed by a third ground copper sheet, and each ground terminal of the electrical connector is further electrically connected to the third ground copper sheet.

18. The electronic assembly according to claim 17, wherein the groups of signal terminals comprise groups of differential signal terminals, with each group of differential signal terminals having two signal terminals transmitting a differential signal, and at least one ground terminal is disposed between two adjacent groups of differential signal terminals.

19. The electronic assembly according to claim 17, wherein two ground terminals are disposed between two adjacent groups of differential signal terminals.

20. The electronic assembly according to claim 17, wherein a width of each ground terminal is greater than a width of each signal terminal.

* * * * *